United States Patent
Falkenberg et al.

(10) Patent No.: US 9,546,641 B2
(45) Date of Patent: Jan. 17, 2017

(54) FACILITATED HANDLING OF WIND TURBINE BLADES

(71) Applicant: SIEMENS AKTIENGESELLSCHAFT, München (DE)

(72) Inventors: Peter Loevenskjold Falkenberg, Herning (DK); Hans Laurberg, Århus C (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 666 days.

(21) Appl. No.: 13/897,632

(22) Filed: May 20, 2013

(65) Prior Publication Data

US 2013/0323007 A1    Dec. 5, 2013

(30) Foreign Application Priority Data

Jun. 1, 2012 (EP) ................................... 12170532

(51) Int. Cl.

| | | |
|---|---|---|
| *F03D 1/00* | (2006.01) | |
| *F03D 1/06* | (2006.01) | |
| *B66C 1/12* | (2006.01) | |
| *A45C 11/00* | (2006.01) | |
| *B66C 1/62* | (2006.01) | |

(52) U.S. Cl.
CPC ............... *F03D 1/065* (2013.01); *A45C 11/00* (2013.01); *B66C 1/122* (2013.01); *B66C 1/62* (2013.01); *F03D 1/001* (2013.01); *F03D 1/005* (2013.01); *F03D 1/0658* (2013.01); *F05B 2230/61* (2013.01); *F05B 2240/98* (2013.01); *Y02E 10/721* (2013.01); *Y02E 10/726* (2013.01); *Y02E 10/728* (2013.01); *Y02P 70/523* (2015.11)

(58) Field of Classification Search
CPC ........ F03D 1/065; F03D 1/0658; F03D 1/001; F03D 1/005; F03D 13/20; B66C 1/62; B66C 1/122; A45C 11/00; Y02P 70/523; Y02E 10/728; Y02E 10/721; Y02E 10/726; F05B 2230/61; F05B 2240/98
USPC ....................................... 416/244 A; 206/522
See application file for complete search history.

(56) References Cited

U.S. PATENT DOCUMENTS

| | | |
|---|---|---|
| 4,285,431 A | 8/1981 | Wickman |
| 7,374,405 B2 | 5/2008 | Wobben |
| 2010/0143130 A1 | 6/2010 | Cairo |

(Continued)

FOREIGN PATENT DOCUMENTS

| | | |
|---|---|---|
| CN | 101541660 A | 9/2009 |
| CN | 102079477 A | 6/2011 |
| EP | 2213587 A1 | 8/2010 |

*Primary Examiner* — Ninh H Nguyen
*Assistant Examiner* — Aaron R Eastman (57) ABSTRACT

A device for facilitating handling of a wind turbine blade is provided. The device includes an inflatable member adapted to be arranged at the wind turbine blade such that the inflatable member covers at least a part of the wind turbine blade, wherein, when the inflatable member is arranged at the wind turbine blade and inflated, an aerodynamic drag coefficient of the wind turbine blade with the arranged inflatable member is less than an aerodynamic drag coefficient of the wind turbine blade. Further, there is described a system for handling a wind turbine blade, and a method of facilitating handling of a wind turbine blade.

11 Claims, 11 Drawing Sheets

(56) References Cited

U.S. PATENT DOCUMENTS

2010/0193394 A1* 8/2010 Casazza ................ B65D 61/00
  206/522

* cited by examiner

FACILITATED HANDLING OF WIND TURBINE BLADES

CROSS REFERENCE TO RELATED APPLICATIONS

The present application claims priority to European Patent Office application No. 12170532.1 EP filed Jun. 1, 2012, the entire content of which is hereby incorporated herein by reference.

FIELD OF INVENTION

The present invention relates to the field of handling of blades for wind turbines, in particular during installation of such blades.

ART BACKGROUND

During installation of blades on wind turbines the characteristic shape of a blade may experience unforeseeable drag effects caused by passing winds. Such drag effects may cause the blade to yaw or swing in an uncontrollable manner when the blade is suspended from lifting equipment, such as a crane.

In order to compensate for horizontal movements, the lifting equipment may be fitted with tack-wires. However, such tack-wires apply large forces onto the crane.

U.S. Pat. No. 7,374,405 B2 relates to an apparatus for handling rotor blades. The apparatus comprises a carrier element connected with a rotor blade receiving means. The receiving means includes a carrier frame configured to enclose at least three sides of a rotor blade upon handling. A plurality of inflatable cushions may be provided throughout the rotor blade receiving means. One disadvantage of this solution is, however, that a large and expensive carrier frame is needed for carrying the blade.

There may be a need for an improved and simplified way of handling wind turbine blades.

SUMMARY OF THE INVENTION

This need may be met by the subject matter according to the independent claims. Advantageous embodiments of the present invention are described by the dependent claims.

According to a first aspect of the invention, there is provided a device for facilitating handling of a wind turbine blade. The described device comprises an inflatable member adapted to be arranged at the wind turbine blade such that the inflatable member covers at least a part of the wind turbine blade. When the inflatable member is arranged at the wind turbine blade and inflated, an aerodynamic drag coefficient of the wind turbine blade with the arranged inflatable member is less than an aerodynamic drag coefficient of the wind turbine blade.

This aspect of the invention is based on the idea that by covering at least a part of a blade for a wind turbine with an inflatable member, the aerodynamic drag coefficient can be reduced in comparison to the aerodynamic drag coefficient of the blade itself. Thereby, the blade together with the inflated inflatable member is less susceptible to wind and turbulence than the blade alone. Accordingly, handling of the blade, e.g. during installation of the blade at a nacelle or rotor of a wind turbine, can be facilitated as less force will be applied to the lifting equipment due to influences from wind and/or turbulence.

The aerodynamic drag coefficient (commonly referred to as $c_d$, $c_x$ or $c_w$) is a dimensionless quantity that is used to quantify the drag or resistance of an object in a fluid environment, such as air. A lower drag coefficient indicates that the object will have less aerodynamic drag. The drag coefficient is associated with a particular surface area of the object.

The inflatable member may preferably be any inflatable structure, such as a bag- or balloon-like structure, made from a suitable resilient, non-resilient or elastic material, such as plastic. When the inflatable member is inflated, e.g., by feeding pressurized air to an inlet of the inflatable member, its outer surface takes on a rounded shape. Thereby, when at least a part of a wind turbine blade is covered by the inflated structure, the rounded shape will reduce the aerodynamic drag coefficient in comparison to the corresponding aerodynamic drag coefficient of the relatively flat surface of the blade without the inflatable member.

In the present context, comparisons of aerodynamic drag coefficients with and without inflatable member are, unless otherwise indicated, to be understood as referring to the same direction relative to a wind turbine blade. In other words, when it is stated that the aerodynamic drag coefficient of the wind turbine blade with (i.e. together with) the arranged inflatable member is less than the aerodynamic drag coefficient of the wind turbine blade (i.e. without the inflatable member), it is to be understood that reference is made to the same direction of flow relative to the wind turbine blade. Thus, the comparison relates to a given direction of flow relative to the blade, in particular to directions of flow that have a significant component in a direction perpendicular to the relatively flat sides of the wind turbine blade.

According to a further embodiment of the invention, the inflatable member is adapted to be arranged at one side of the wind turbine blade or to circumferentially surround the wind turbine blade.

By arranging the inflatable member at one side of the wind turbine blade, at least a part of this side of the blade may be covered by the inflatable member.

By arranging the inflatable member to circumferentially surround the wind turbine blade, at least a section of the wind turbine blade is completely covered by the inflatable member, i.e. along the entire circumference of the section.

In many cases, in particular when the inflatable member is designed to cover a long section of the wind turbine blade, it is easier to arrange the inflatable member at a side of the blade than to arrange it to circumferentially surround the blade. This is because the latter requires pulling the inflatable member over the blade (like a sock over a leg), which due to the significant length and size of the blade may be a laborious task.

On the other hand, the best results (i.e. the lowest resulting aerodynamic drag coefficient) may often be achieved by circumferentially surrounding the wind turbine blade with the inflatable member. First of all, the shape of the "backside" relative to the direction of flow is also significant for the resulting aerodynamic drag coefficient. Furthermore, by improving the aerodynamic properties along the entire circumference of the blade, variations in wind direction relative to the direction of the blade will have less impact.

It should be noted that by arranging two inflatable members, one on each opposing side of the wind turbine blade, the advantages of the circumferentially surrounding arrangement of one inflatable member may be obtained.

According to a further embodiment of the invention, the inflatable member is adapted to cover a longitudinal section of the wind turbine blade.

As mentioned above, the longitudinal section may be covered by the inflatable member on one or both sides of the wind turbine blade, or the longitudinal section may be circumferentially surrounded by the inflatable member.

In the present context, the term "longitudinal section of the wind turbine blade" denotes both a part of the blade (in the longitudinal direction thereof) as well as the whole blade. In other words, the inflatable member may cover the complete blade or only a (true) section of the blade in the longitudinal direction of the blade. In embodiments where the inflatable member is designed to cover only a part of the blade, the complete blade may be covered by arranging more inflatable members adjacent to one another. Inflatable members which are designed to cover only a part (e.g. half, a third or a quarter etc.) of the blade length may be easier to transport and handle than inflatable members which are designed to cover an entire blade as modern wind turbine blades may be up to 75 m long or even longer.

According to a further embodiment of the invention, the inflatable member is adapted to contain the wind turbine blade within an inflatable volume of the inflatable member.

This may be achieved by making the inflatable member large enough to completely enclose or surround the entire wind turbine blade. Alternatively, the inflatable member may surround only a longitudinal section of the turbine blade and be properly sealed (e.g. by means of tight strapping) against the surface of the blade in order to form the inflatable volume. In both cases, when the inflatable member is inflated, the wind turbine blade will be surrounded by and be in direct contact with the air (or other suitable gas) that is used to inflate the inflatable member.

According to a further embodiment of the invention, the inflatable member comprises an inner wall and an outer wall which together form an inflatable volume of the inflatable member.

In the present context, the inner wall may denote a part of the inflatable member which is supposed to be in direct contact with at least a part of the surface of the wind turbine blade, whereas the outer wall may denote a part of the inflatable member which is supposed to constitute the aerodynamic surface of the inflatable member when the inflatable member is arranged at the wind turbine blade and inflated.

In some embodiments, the inner wall is specifically designed to fit the shape of the surface of the wind turbine blade and/or to have certain properties (such as surface friction) that facilitate arranging it at or fastening it to the wind turbine blade. In other embodiments, the inflatable member may be symmetrical in the sense that the design and properties of the inner wall and the outer wall are substantially identical.

According to a further embodiment of the invention, the inner wall comprises a membrane adapted to separate the inflatable volume from the wind turbine blade.

The membrane may have frictional properties that facilitate keeping the inflatable member in the intended position at the wind turbine blade. Further, the membrane may be shaped to fit the shape of the (part of the) wind turbine blade which it is intended to cover. Further, the membrane may exhibit less resiliency or elasticity than the outer wall such that it is stretched less than the outer wall during inflation of the inflatable member.

According to a further embodiment of the invention, the inflatable member comprises a passage adapted to allow lifting equipment to engage with the wind turbine blade.

The passage may extend through the inflatable member such that a strap or belt can extend through it and engage with the wind turbine blade, for example by being wrapped around the turbine blade.

According to a further embodiment of the invention, the device further comprises a lifting member adapted to engage with lifting equipment.

The lifting member may be constituted by one or more strap- or belt-like members which are built into or forms part of the inflatable member and are adapted to engage with lifting means by e.g. a hook or the like. The strap- or belt-like member(s) preferably extend(s) along at least a part of the circumference of the inflatable member such that a lifting force can be applied to the inflatable member.

According to a further embodiment of the invention, the device further comprises a valve member for inflating and/or deflating the inflatable member.

The valve member may be formed as a single valve which may be controllable (i.e. opened and closed) by directly operating a screw or by means of a remote control. Alternatively, one type of valve may be provided for feeding gas into the inflatable member in order to inflate it, e.g. by feeding pressurized air, and a separate valve, such as a removable plug, may be provided for deflating the inflatable member. In the latter case, the plug may be provided with a line or wire, such that the plug can be removed by pulling the line or wire.

According to a second aspect of the invention, there is provided a system for handling a wind turbine blade. The described system comprises (a) a device according to the first aspect or any of the embodiments described above, and (b) lifting equipment for lifting a wind turbine blade to a predetermined position. The lifting equipment is adapted to engage with the wind turbine blade and/or the device.

This aspect of the invention is based on the idea that by combining a device according to the first aspect or any of the embodiments described above and lifting equipment for a wind turbine blade, handling of such a blade, e.g. during installation of the blade at a nacelle or rotor of a wind turbine, can be facilitated as the inflatable member of the device can assure that less force will be applied to the lifting equipment due to influences from wind and/or turbulence.

The lifting equipment may be a crane equipped with wires, connectors, etc. for lifting a wind turbine blade, e.g. in order to install the blade at the rotor of a wind turbine. The predetermined position may e.g. be in the vicinity of a rotor or nacelle of a wind turbine or it may be a position above a truck or other transporting unit for transporting wind turbine blades. The lifting equipment is adapted to engage with the wind turbine blade, e.g. by wrapping one or more belt- or strap-like members around the blade, or with the inflatable device, e.g. by wrapping one or more belt- or strap-like members around the inflatable member of the device or by connecting hooks to corresponding engaging members of the device. The lifting equipment may also be adapted to engage with both the blade and the device in any of the aforementioned manners.

According to a third aspect of the invention, there is provided a method of facilitating handling of a wind turbine blade. The described method comprises (a) arranging an inflatable member at the wind turbine blade such that the inflatable member covers at least a part of the wind turbine blade, and (b) inflating the inflatable member such that an aerodynamic drag coefficient of the wind turbine blade with the arranged inflatable member becomes less than an aerodynamic drag coefficient of the wind turbine blade.

This aspect of the invention is based on the idea that by arranging an inflatable member such that it covers at least a part of a blade for a wind turbine and inflating the inflatable member, the aerodynamic drag coefficient can be reduced in comparison to the aerodynamic drag coefficient of the blade itself (i.e. without the inflatable member). Thereby, the blade together with the inflated inflatable member is less susceptible to wind and turbulence than the blade alone. Accordingly, handling of the blade, e.g. during installation of the blade at a nacelle or rotor of a wind turbine, can be facilitated as less force will be applied to the lifting equipment due to influences from wind and/or turbulence.

The inflating may be performed by feeding a gas, such as pressurized air, to the inflatable member. Thereby, at least a part of the surface of the inflatable member takes on a rounded shape which has a smaller aerodynamic drag coefficient than the corresponding part of the blade surface, i.e. the part of the blade surface which is covered by the inflatable member.

According to a further embodiment of the invention, the method further comprises (a) lifting the wind turbine blade and the inflated inflatable member to a predetermined position, and (b) deflating the inflatable member.

The lifting may be performed by utilization of a crane or similar lifting equipment.

The deflating may be performed by opening a remotely controllable valve or by pulling a plug from the inflatable member, e.g. by pulling a wire connected to the plug.

According to a further embodiment of the invention, the method further comprises removing the inflatable member.

The inflatable member may be removed once the turbine blade has been handled, e.g. installed at the rotor of a wind turbine, as intended. The removal may be facilitated by prior deflation of the inflatable member and/or by arranging the wind turbine blade such that it points downwards. The latter may be achieved by rotating the rotor of the wind turbine at which the blade has been installed.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject matter also any combination of features relating to different subject matters, in particular a combination of features of the method type claims and features of the apparatus type claims, is disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment, to which the invention is not limited.

DETAILED DESCRIPTION

The illustration in the drawing is schematically. It is noted that in different figures, similar or identical elements are provided with the same reference signs or with reference signs, which are different from the corresponding reference signs only within the first digit.

Figure 1:
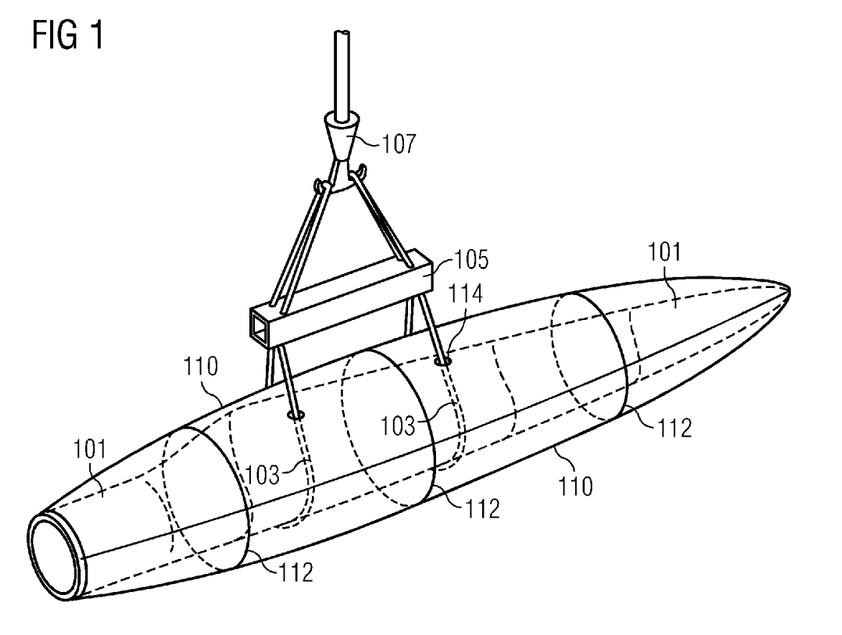
FIG. 1 shows an embodiment of a system for handling a blade for a wind turbine.

FIG. 1 shows an embodiment of a system for handling a blade 101 for a wind turbine, e.g. during installation of the blade 101. The blade 101 is supported by straps 103 which extend around a part of the circumference of the blade 101. The parts of the straps 103 that surround the blade 101 are separated a given distance from each other by beam 105. The ends of the straps 103 are held by a hook 107 which extends from a crane or the like (not shown). The blade 101 is surrounded and covered by an inflatable bag 110. The inflatable bag 110 is preferably made of a plastic material and contains reinforcing ring-like or elliptical elements 112 (e.g. circular wires) for shaping the inflatable bag 110 such that it takes on a rounded outer surface shape when it is inflated with a gas, such as air. The inflatable bag 110 comprises openings 114 for allowing the straps 103 to extend through the inflatable bag 110. The openings 114 are preferably sealed such that gas is prevented from leaking to the outside when the inflatable bag 110 is inflated and handled (e.g. lifted) by raising or lowering the hook 107 by means of a crane (not shown). Thereby, when the blade 101 covered by the inflated inflatable bag 110 is lifted (e.g. during mounting of the blade at a wind turbine rotor), the aerodynamic drag coefficient is significantly reduced due to the rounded outer surface shape of the inflatable bag 110 in comparison to a case where the blade 101 is handled without the inflated bag 110.

Figure 2:
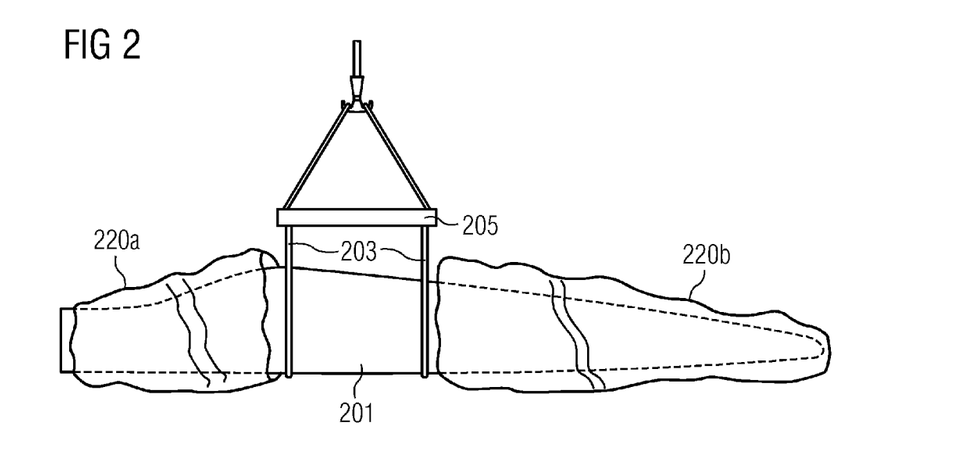
FIG. 2 shows an embodiment of a system for handling a blade for a wind turbine.

FIG. 2 shows a further embodiment of a system for handling a blade 201 for a wind turbine, e.g. during installation of the blade 201. The blade 201 is supported by straps 203 which extend around a part of the circumference of the blade 201. The parts of the straps 203 that surround the blade 201 are separated a given distance from each other by beam 205. The ends of the straps 203 are held by a hook (not shown) which extends from a crane or the like (not shown). The blade 201 is surrounded and at least partially covered by two inflatable bags 220a, 220b. The inflatable bags 220a, 220b are preferably made of a plastic material and may contain reinforcing ring-like or elliptical elements (not shown) for shaping the inflatable bags 220a, 220b such that these take on a rounded outer surface shape when inflated with a gas, such as air. The inflatable bags 220a, 220b may comprise openings (e.g. slits) for allowing the straps 203 to extend through the inflatable bags 220a, 220b. Such openings are or can preferably be sealed such that gas is prevented from leaking to the outside when the inflatable bags 220a, 220b are inflated and handled (e.g. lifted). Thereby, when the blade 201 is at least partially covered by the inflated inflatable bags 220a, 220b and lifted (e.g. during mounting of the blade at a wind turbine rotor), the aerodynamic drag coefficient can be significantly reduced due to the rounded outer surface shapes of the inflatable bags 220a, 220b in comparison to a case where the blade 201 is handled without the inflated bags 220a, 220b.

Figure 3:
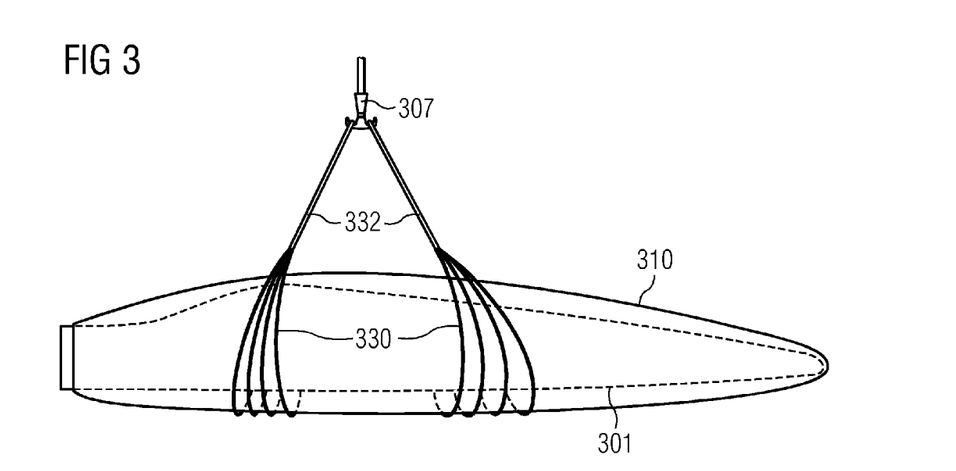
FIG. 3 shows an embodiment of a system for handling a blade for a wind turbine.

FIG. 3 shows a variation of the embodiment shown in FIG. 1. In the embodiment shown in FIG. 3, the blade 301 is surrounded by an inflated bag 310 which is at least partially surrounded by two bundles of straps 330. The bundles of straps 330 are connected to a hook 307 by means of intermediate straps 332. In this embodiment, the bundles of straps 330 support the inflated bag 310 which surrounds the blade 301. The straps of the bundles of straps 330 are separated a certain distance from each other and are sufficiently wide to not cut through the surface of the inflated bag 310.

Figure 4A:
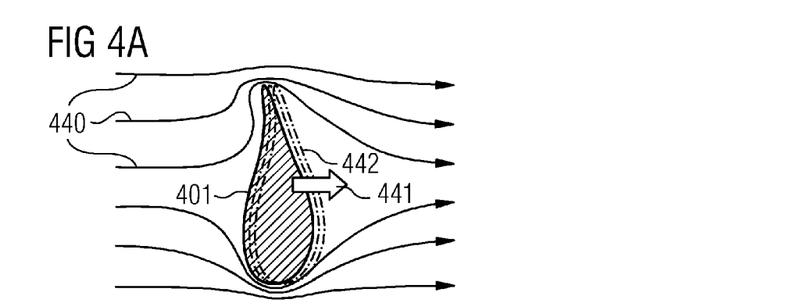
FIG. 4A shows an illustration of the aerodynamic properties of a wind turbine blade.

FIG. 4A illustrates a cross-sectional view of wind 440 moving past a "naked" wind turbine blade 401. Due to the inherently high aerodynamic drag coefficient of the surface of the blade 401, the wind 440 causes aerodynamic lift and drag effects which apply significant force to the blade 401. These forces may vary significantly along the length (perpendicular to the plane of the drawing) of the blade 401 and accordingly apply highly varying local forces to the blade 401 along the length of the blade 401 (i.e. along a direction perpendicular to the plane of the drawing). The resulting local movement of a blade-section is illustrated by arrow 441 and dashed lines 442.

Figure 4B:
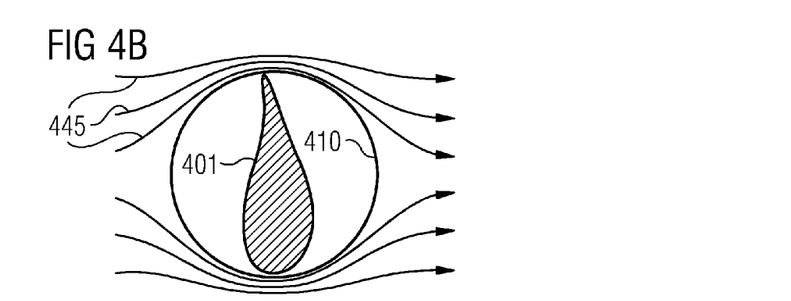
FIG. 4B shows an illustration of the aerodynamic properties of a wind turbine blade with a device according to an embodiment.
Figure 4C:
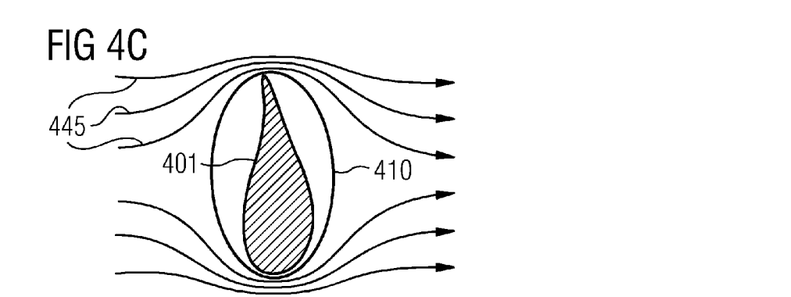
FIG. 4C shows an illustration of the aerodynamic properties of a wind turbine blade with a device according to an embodiment.
Figure 4D:
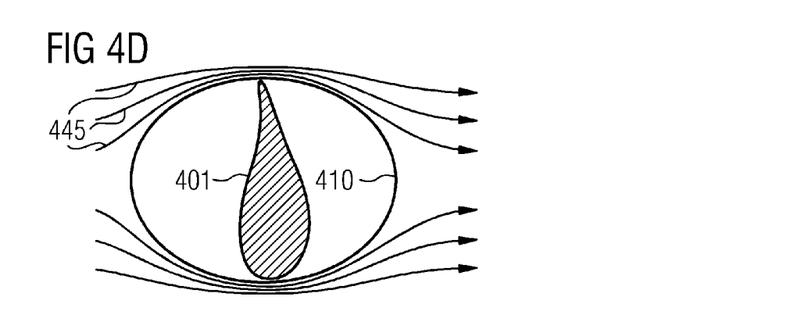
FIG. 4D shows an illustration of the aerodynamic properties of a wind turbine blade with a device according to an embodiment.

FIGS. 4B to 4D illustrate three embodiments of the present invention where the blade 401 is surrounded by an inflated bag 410 which due to its generally rounded surface shape has a lower aerodynamic drag coefficient than the raw surface of the wind turbine blade 401. Thus, the wind 445 has significantly less influence on the blade 401 in comparison to the case with a "naked" blade 401 as illustrated in FIG. 4A. The illustrations in FIG. 4B to 4D differ only in the cross-sectional shape of the inflated bag 410, which in FIG. 4B is illustrated as being substantially circular, and in FIGS. 4C and 4D as being substantially elliptical. In FIG. 4C, the longer main axis of the ellipsoid extends substantially in parallel with the width dimension of the blade 401, whereas in FIG. 4D, the longer main axis of the ellipsoid extends substantially perpendicular to the width dimension of the blade 401.

Figure 5:
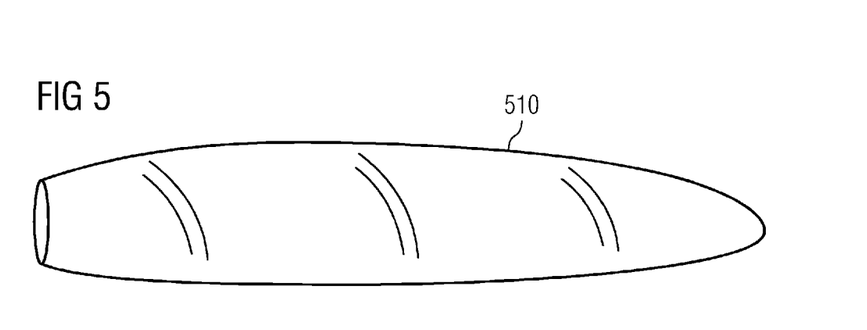
FIG. 5 shows an inflatable member according to an embodiment.

FIG. 5 illustrates an inflatable bag 510 designed to cover an entire wind turbine blade (not shown) in a similar manner as illustrated in FIGS. 1 and 3.

Figure 6:
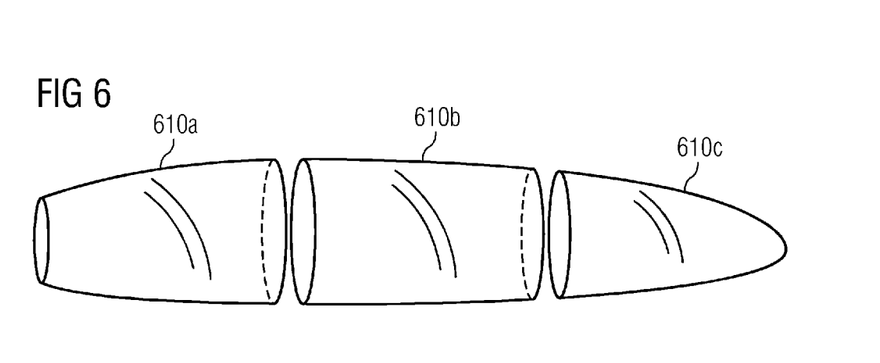
FIG. 6 shows an inflatable member according to an embodiment.

FIG. 6 illustrates an inflatable bag comprising three sections, a root section 610a designed to cover approximately the third of a blade closest to a rotor, a tip section 610c designed to cover approximately the third of the blade closest to a tip of the blade, and a middle section 610b designed to cover the remaining part of the blade between the root section 610a and the tip section 610c. Each section 610a, 610b and 610c may have a double wall, i.e. an inner wall and an outer wall (not shown), such that when a section is inflated by e.g. providing pressurized air between the inner and outer walls, the inner wall is pressed against the surface of a blade (not shown) and the outer wall forms the outer surface of the inflatable bag section 610a, 610b, 610c.

Figure 7A:
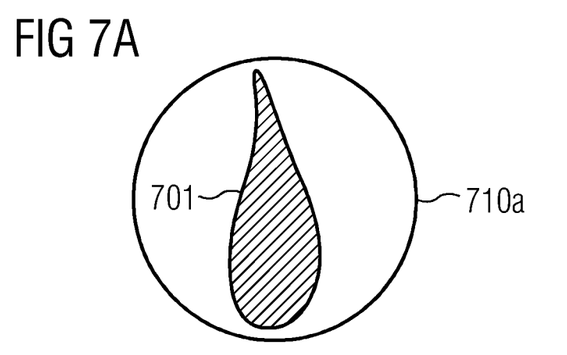
FIG. 7A shows a cross-sectional view of an inflatable member arranged at a wind turbine blade in accordance with an embodiment.

FIG. 7A shows a cross-sectional view of an inflatable bag 710a which surrounds the circumference of a blade 701. The inflatable bag 710a corresponds to any of the inflatable bags 110, 220a, 220b, 310, 410, 510, 610a, 610b and 610c shown respectively in FIGS. 1 to 6.

Figure 7B:
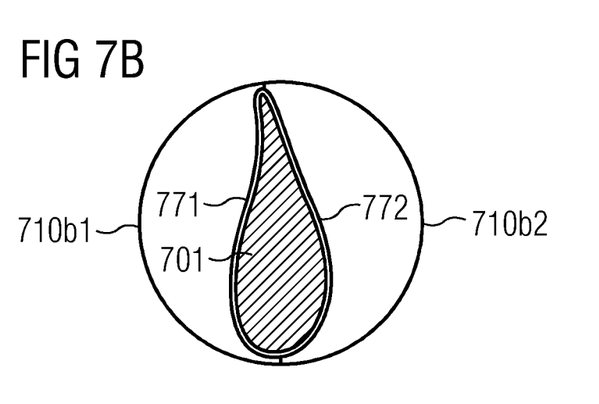
FIG. 7B shows a cross-sectional view of an inflatable member arranged at a wind turbine blade in accordance with an embodiment.

FIG. 7B shows a cross-sectional view of an inflatable bag 710b1, 710b2 which is separated from blade 701 by inner membranes 771, 772 which fit snuggly along the surface of the blade 701. The inflatable bag 710b1, 710b2 may be formed as a single unit or as two separate inflatable units.

Figure 7C:
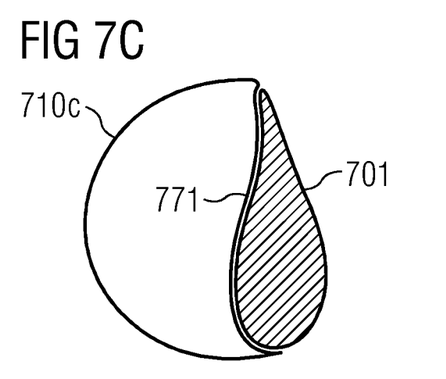
FIG. 7C shows a cross-sectional view of an inflatable member arranged at a wind turbine blade in accordance with an embodiment.

FIG. 7C shows an embodiment where inflatable bag 710c is designed to extend only on one side of the blade 701. The inflatable bag 710c comprises an inner membrane 771 which fits snuggly along the left-hand surface of the wind turbine blade 701 when the inflatable bag 710c is inflated. The inflatable bag 710c may be kept in position relative to the blade 701 by straps (as shown e.g. in FIGS. 1 and 2) or by other suitable means.

Figure 8A:
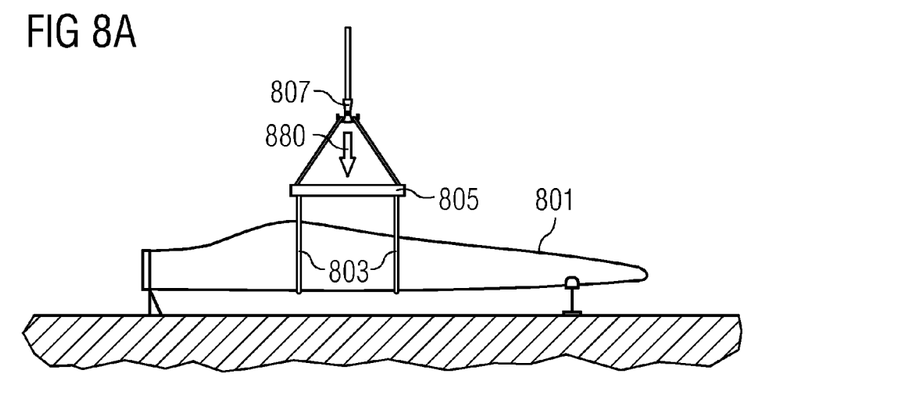
FIGS. 8A to 8F show an overview of a process of installing a wind turbine blade in accordance with an embodiment.
Figure 8B:
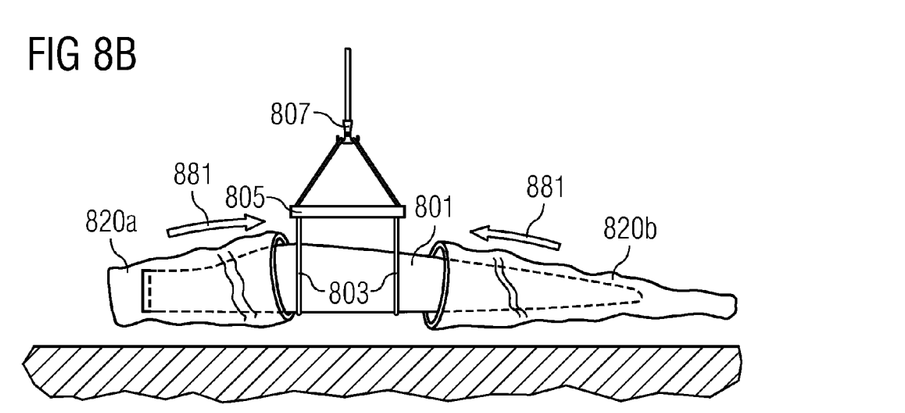
Figure 8C:
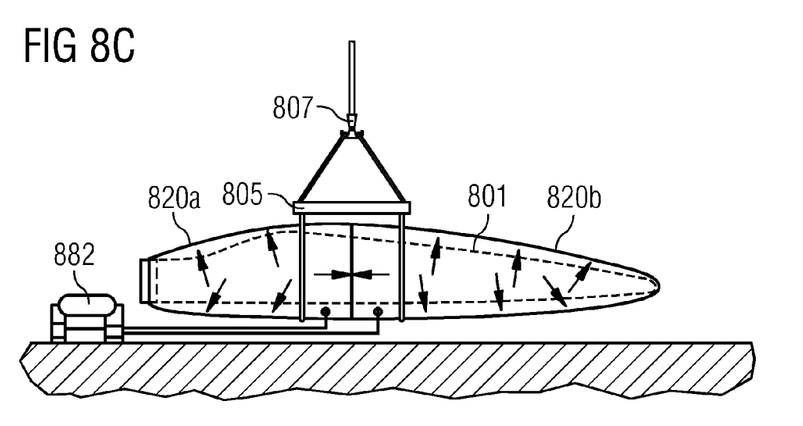
Figure 8D:
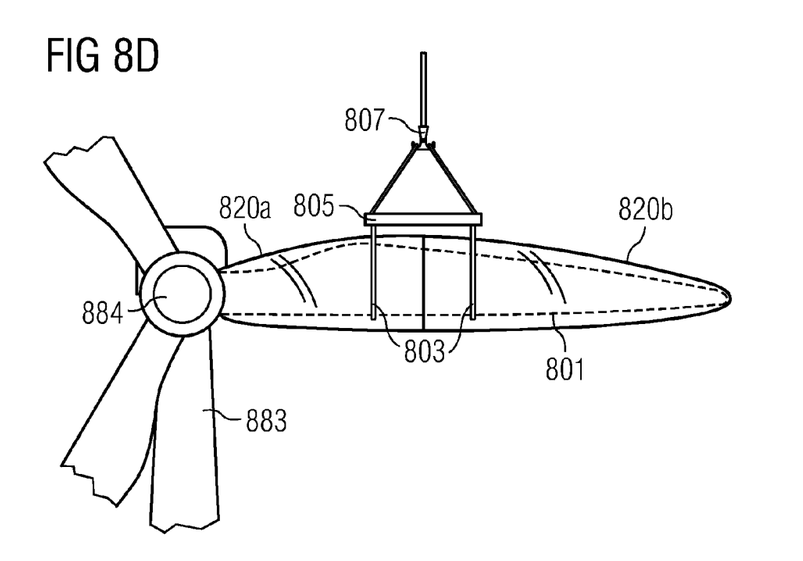
Figure 8E:
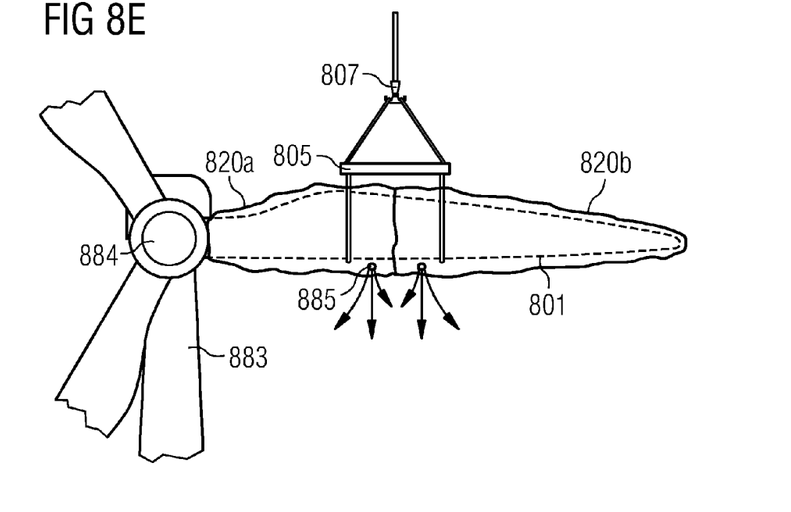
Figure 8F:
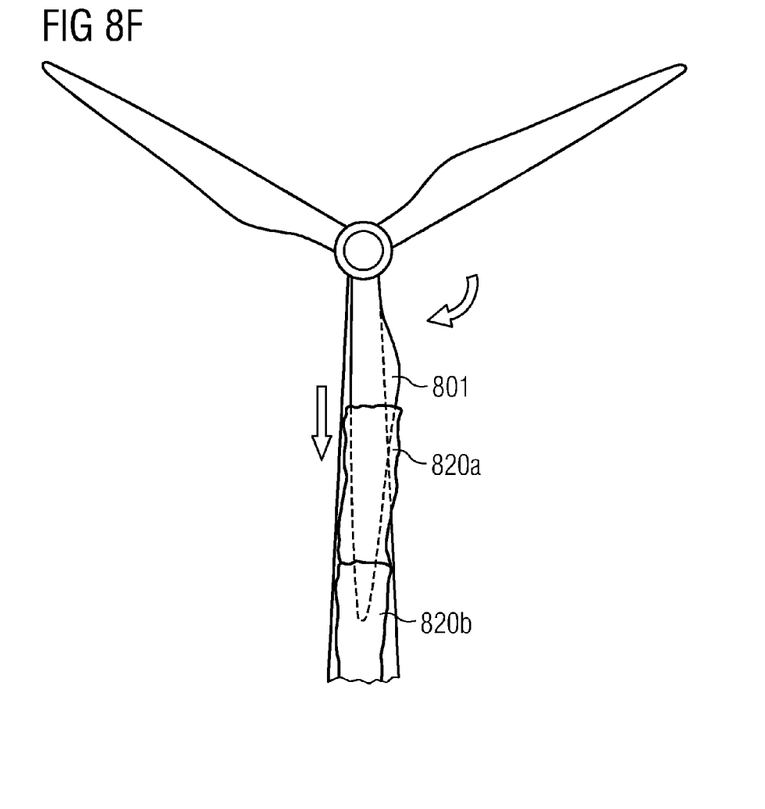

FIGS. 8A to 8F show an overview of a process of installing a wind turbine blade in accordance with an embodiment. In the first step of the process as shown in FIG. 8A, a blade 801 is positioned on the ground and lifting equipment (straps 803, beam 805 and hook 807) extending from a crane (not shown) are moved downward in direction of arrow 880 and fitted to the blade 801. In a second step, as shown in FIG. 8B, inflatable bags 820a and 820b are pulled over the blade 801 from the opposing ends of the blade 801 as indicated by arrows 881. Once the inflatable bags 820a, 820b have been properly arranged and sealed relative to the blade 801 and the straps 803, the inflatable bags 820a, 820b are inflated by means of air pump 882. In the present embodiment, the inflatable bags 820a, 820b are two-layered structures comprising inner membranes or walls, which fit snuggly against the surface of blade 801 when air is supplied by air pump 882. After disconnecting the air pump 882, the blade 801 surrounded by the inflated bags 820a and 820b is lifted by a crane (not shown) and positioned and installed at rotor 884 at the top of a wind turbine tower 883 as shown in FIG. 8D. After installation of the rotor blade 801, the air is released from the inflated bags 820a and 820b through valves or outlets 885, e.g. by pulling corresponding plugs or by remote control. Finally, as shown in FIG. 8F, after releasing the air from the inflated bags 820a and 820b, the rotor 884 is rotated to point downwards such that the deflated bags 820a, 820b can be easily removed, e.g. by pulling them downwards.

Figure 9A:
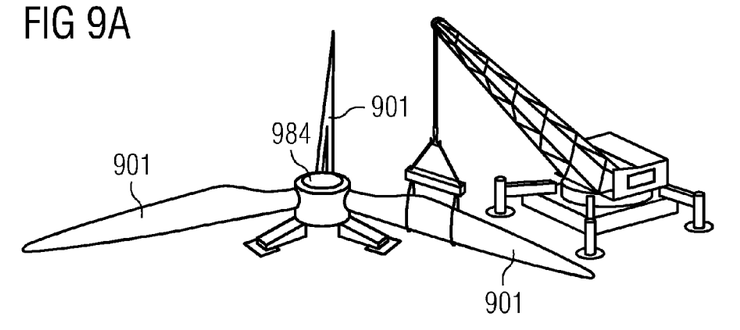
FIGS. 9A to 9F show an overview of another process of installing a wind turbine blade in accordance with an embodiment.
Figure 9B:
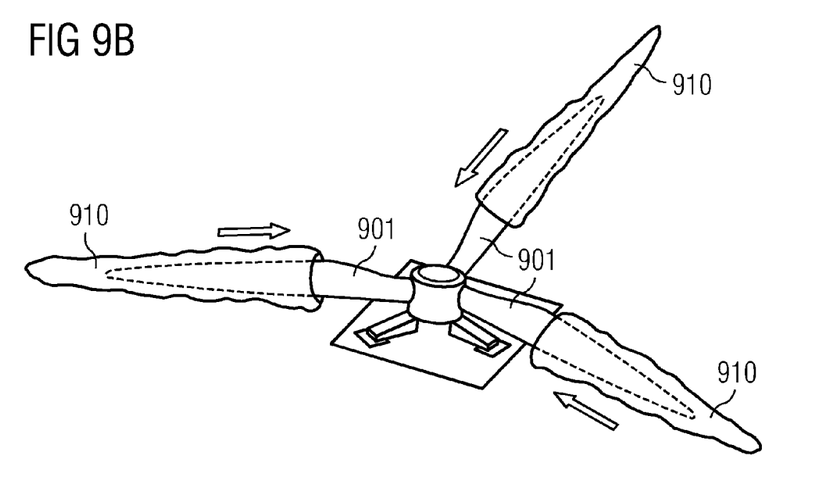
Figure 9C:
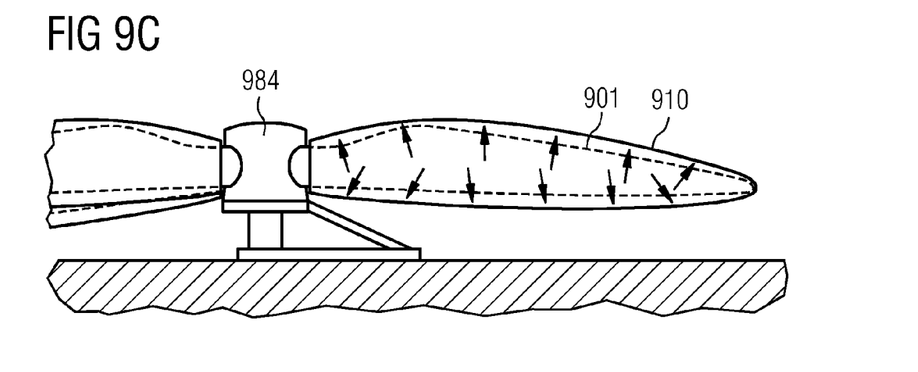
Figure 9D:
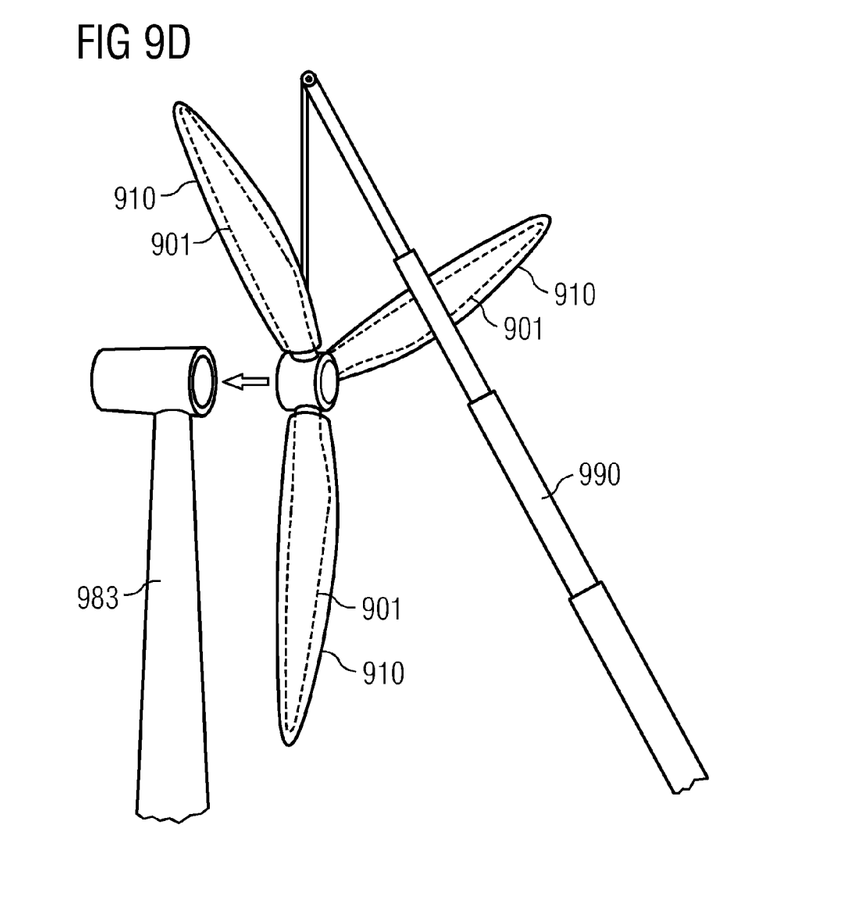
Figure 9E:
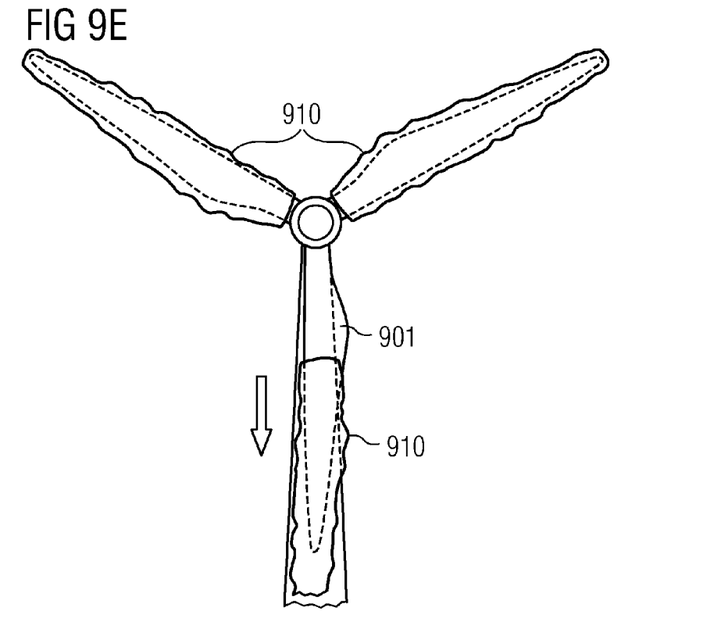
Figure 9F:
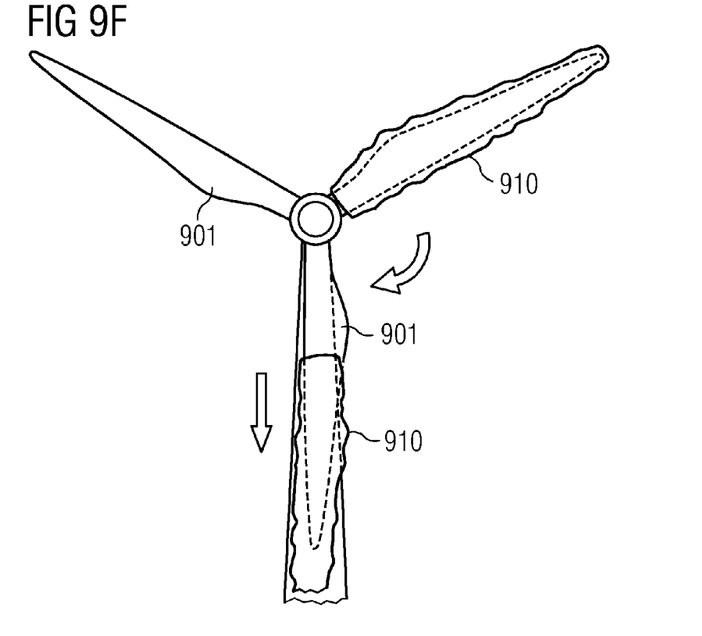

FIGS. 9A to 9F show an overview of a process of installing a wind turbine blade in accordance with a further embodiment. In this embodiment, as shown in FIG. 9A, the blades 901 are initially mounted to rotor 984 on the ground. Then, as shown in FIG. 9B, inflatable bags 910 are pulled over the blades 901. Once the inflatable bags 910 have been properly installed at the blades 901, the inflatable bags are inflated as shown in FIG. 9C. Then, as shown in FIG. 9D, the rotor 984 with the blades 901 covered by the inflated bags 910 is arranged and mounted at the top of tower 983 by means of a crane 990. After mounting the rotor 984 with the blades 901 covered by the inflated bags 910, the bags 910 are deflated, as shown in FIG. 9E, and, if necessary, the rotor is rotated until one of the blades points substantially vertically downwards. The bag 910 on the lower blade 901, i.e. the blade 901 pointing substantially vertically downwards, is pulled off the blade 901 and lowered to the ground. Then, as shown in FIG. 9F, the rotor is turned 120°, the deflated bag 910 is pulled off the blade 901, and the procedure is repeated for the last blade 901.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

We claim:

1. A device for facilitating handling of a wind turbine blade, the device comprising:
an inflatable member arranged at the wind turbine blade such that the inflatable member covers at least a part of the wind turbine blade,
wherein, when the inflatable member is arranged at the wind turbine blade, and inflated, an outer surface of the inflatable member has a rounded shape such that a first aerodynamic drag coefficient of the wind turbine blade with the arranged inflatable member is less than a second aerodynamic drag coefficient of the wind turbine blade without the arranged inflatable member, and
wherein a cross section of the inflatable member is variable along its length in order to accommodate a characteristic shape of a wind turbine blade; and
wherein the inflatable member comprises a passage defined by the inflatable member and extending through the inflatable member to allow lifting equipment to engage with the wind turbine blade,
wherein the inflatable member comprises an inner wall and an outer wall which together form an inflatable volume of the inflatable member, and
wherein the inner wall comprises a membrane configured to separate the inflatable volume from the wind turbine blade, and wherein the membrane comprises a friction inducing surface and a lesser degree of resiliency or elasticity relative to the outer wall.

2. The device according to claim 1, wherein the inflatable member is configured to be arranged at one side of the wind turbine blade and does not circumferentially surround the wind turbine blade.

3. The device according to claim 1, wherein the inflatable member circumferentially surrounds the wind turbine blade.

4. The device according to claim 1, wherein the inflatable member is configured to cover a longitudinal section of the wind turbine blade.

5. The device according to claim 1, wherein the inflatable member is configured to contain the wind turbine blade within an inflatable volume of the inflatable member.

6. The device according to claim 1, further comprising a lifting member configured to engage with lifting equipment.

7. The device according to claim 1, further comprising a valve member for inflating and/or deflating the inflatable member.

8. A system for handling a wind turbine blade, the system comprising:
a device according to claim 1; and
lifting equipment for lifting a wind turbine blade to a predetermined position,
wherein the lifting equipment is configured to engage with the wind turbine blade and the device.

9. The method according to claim 8, further comprising:
lifting the wind turbine blade and the inflated inflatable member to a predetermined position, and
deflating the inflatable member.

10. A method of facilitating handling of a wind turbine blade, the method comprising:
arranging an inflatable member at the wind turbine blade such that the inflatable member covers at least a part of the wind turbine blade;
inflating the inflatable member such that an outer surface thereof takes on a rounded shape and a first aerodynamic drag coefficient of the wind turbine blade with the arranged inflatable member becomes less than a second aerodynamic drag coefficient of the wind turbine blade without the arranged inflatable member, and
engaging lifting equipment with the wind turbine blade, wherein the inflatable member comprises a passage defined by the inflatable member and extending through the inflatable member to allow the lifting equipment to engage with the wind turbine blade;
wherein a cross section of the inflatable member is variable along its length in order to accommodate a characteristic shape of a wind turbine blade,
wherein the inflatable member comprises an inner wall and an outer wall which together form an inflatable volume of the inflatable member, and
wherein the inner wall comprises a membrane configured to separate the inflatable volume from the wind turbine blade, and wherein the membrane comprises a friction inducing surface and a lesser degree of resiliency or elasticity relative to the outer wall.

11. The method according to claim 10, further comprising:
removing the inflatable member.

* * * * *